United States Patent
Wingrove et al.

(10) Patent No.: US 11,099,339 B1
(45) Date of Patent: Aug. 24, 2021

(54) MANAGEMENT INTERFACE HANDLER TO EXPEDITE MODULE BOOT TIME IN PLUGGABLE OPTICAL MODULES

(71) Applicant: Ciena Corporation, Hanover, MD (US)

(72) Inventors: Michael J. Wingrove, Stittsville (CA); David Peter Johnson, Nepean (CA); Eric Maniloff, Stittsville (CA); Munjeen Khan, Ottawa (CA); Fenggao Xu, Kanata (CA)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 16/917,005

(22) Filed: Jun. 30, 2020

(51) Int. Cl.
| | |
|---|---|
| *H04B 10/00* | (2013.01) |
| *G02B 6/42* | (2006.01) |
| *H04B 10/079* | (2013.01) |
| *H04B 10/40* | (2013.01) |

(52) U.S. Cl.
CPC ....... *G02B 6/4284* (2013.01); *H04B 10/0795* (2013.01); *H04B 10/40* (2013.01)

(58) Field of Classification Search
CPC combination set(s) only.
See application file for complete search history.

(56) References Cited

U.S. PATENT DOCUMENTS

| | | | |
|---|---|---|---|
| 8,699,880 | B2 | 4/2014 | Grigoryan et al. |
| 9,515,767 | B2 | 12/2016 | Frankel et al. |
| 10,396,891 | B2 | 8/2019 | Maniloff et al. |
| 10,439,726 | B1* | 10/2019 | Mazzini ............ H04B 10/25891 |
| 2005/0196171 | A1* | 9/2005 | Dybesetter ......... H04B 10/0799 398/135 |
| 2006/0051099 | A1* | 3/2006 | Ekkisogloy ............ H04B 10/40 398/135 |
| 2006/0093286 | A1* | 5/2006 | Dybsetter .............. H04B 10/40 385/92 |
| 2006/0093363 | A1* | 5/2006 | Dybsetter .............. H04B 10/40 398/135 |

(Continued)

OTHER PUBLICATIONS

CFP MSA, CFP MSA Management Interface Specification, 100/40 Gigabit Transceiver Package Multi-Source Agreement, Version 2.6 r06a, Mar. 24, 2017, pp. 1-169.

(Continued)

*Primary Examiner* — Agustin Bello
(74) *Attorney, Agent, or Firm* — Clements Bernard Walker; Lawrence A. Baratta, Jr.; Christopher L. Bernard (57) ABSTRACT

A pluggable optical module includes one or more optical interfaces; an interface for electrically connecting to a host device; and a processor configured to, subsequent to insertion of the pluggable optical module in a host device and performance of a first stage of boot loader, execute an early management interface handler that supports access to management memory on the pluggable optical module by the host device, and continue a boot process of the pluggable optical module including loading an operating system and application software for control and management of the pluggable optical module, wherein the early management interface handler supports queries and provisioning requests from the host device while the boot process is performed. The early management interface handler is loaded after insertion, within less time than required by the full boot process.

20 Claims, 3 Drawing Sheets

(56) References Cited

U.S. PATENT DOCUMENTS

| | | | | |
|---|---|---|---|---|
| 2006/0147216 A1* | 7/2006 | Dybsetter | ............... | H04B 10/69 398/135 |
| 2006/0153569 A1* | 7/2006 | Dybsetter | ............ | H04B 10/801 398/135 |
| 2006/0153570 A1* | 7/2006 | Nelson | ................... | H04B 10/40 398/135 |
| 2006/0159461 A1* | 7/2006 | Nelson | ................... | H04B 10/40 398/135 |
| 2006/0215545 A1* | 9/2006 | Nelson | ................ | H04B 10/672 370/216 |
| 2006/0216040 A1* | 9/2006 | Nelson | ................ | H04B 10/564 398/186 |
| 2007/0065151 A1* | 3/2007 | Dybsetter | ............ | H04B 10/40 398/135 |
| 2007/0168679 A1* | 7/2007 | Ekkizogloy | ............ | H04B 10/40 713/189 |
| 2007/0196104 A1* | 8/2007 | Nelson | ............... | H04B 10/0799 398/25 |
| 2009/0168858 A1* | 7/2009 | Luo | ........................ | H04B 10/40 375/224 |
| 2009/0182531 A1* | 7/2009 | Ekkizogloy | ............ | H04B 10/40 702/182 |
| 2012/0301134 A1* | 11/2012 | Davari | ................ | H04L 41/5038 398/9 |
| 2013/0077968 A1* | 3/2013 | Yang | ...................... | H04B 10/40 398/45 |
| 2013/0182585 A1 | 7/2013 | Chaudhary et al. | | |
| 2014/0024255 A1* | 1/2014 | Robitaille | .............. | H04B 10/40 439/607.2 |
| 2014/0270773 A1* | 9/2014 | Elmoalem | ............... | H04L 63/06 398/66 |
| 2015/0086211 A1* | 3/2015 | Coffey | ............... | H04B 10/0795 398/116 |
| 2017/0207849 A1 | 7/2017 | Sinclair et al. | | |
| 2018/0048391 A1* | 2/2018 | Tanaka | ................ | G06F 13/4234 |
| 2019/0326992 A1 | 10/2019 | Charlton et al. | | |
| 2020/0007471 A1 | 1/2020 | Estabrooks et al. | | |
| 2020/0145106 A1* | 5/2020 | Mazzini | ........... | H04B 10/25891 |

OTHER PUBLICATIONS

CFP MSA, CFP2 Hardware Specification, Revision 1.0, Jul. 31, 2013, pp. 1-64.

CFP MSA, CFP4 Hardware Specification, Revision 1.1, Mar. 18, 2015, pp. 1-34.

CFP MSA, CFP8 Hardware Specification, Revision 1.0, Mar. 17, 2017, pp. 1-49.

CFP MSA, Hardware Specification, Revision 1.4, Jun. 7, 2010, pp. 1-53.

OIF, IA OIF-C-CMIS-01.0, Implementation Agreement for Coherent CMIS, Jan. 14, 2020, pp. 1-34.

OSFP MSA, OSFP Octal Small Form Factor Pluggable Module, Rev 3.0, Mar. 14, 2020, pp. 1-99.

Common Management Interface Specification, Published Rev 4.0, May 8, 2019, pp. 1-265.

QSFP-DD MSA, QSFP-DD Hardware Specification for QSFP Double Density 8X Pluggable Transceiver Rev 5.0, Jul. 9, 2019, pp. 1-82.

* cited by examiner

MANAGEMENT INTERFACE HANDLER TO EXPEDITE MODULE BOOT TIME IN PLUGGABLE OPTICAL MODULES

FIELD OF THE DISCLOSURE

The present disclosure generally relates to pluggable optical modules for use in networking equipment. More particularly, the present disclosure relates to systems and methods for a management interface handler to expedite apparent module boot time in pluggable optical modules.

BACKGROUND OF THE DISCLOSURE

In optical networking, optical interfaces can be realized through pluggable optical modules (also referred to as pluggable modules, pluggable transceivers, plug, or simply "module," etc.). The pluggable optical modules can be defined/standardized via Multisource Agreements (MSAs), such as, without limitation, Small Form-factor Pluggable (SFP), 10 Gigabit small Form-factor Pluggable (XFP), Quad SFP (QSFP) and variants thereof, Octal SFP (OSFP) and variants thereof, C Form-factor Pluggable (CFP) and variants thereof, Analog Coherent Optics (ACO), Digital Coherent Optics (DCO), 400ZR, ZR+, Consortium for On-Board Optics (COBO), etc. Of course, pluggable optical modules can also be proprietary vendor implementations as well. Additionally, new MSAs and the like are continually emerging to address new services, applications, and advanced technology. Standardization allows multiple vendors to design and supply pluggable optical modules reducing risk for vendors and operators, increasing flexibility, and accelerating the introduction of new technology. The standards define the pluggable optical module's mechanical characteristics, management interfaces, electrical characteristics, optical characteristics, power consumption, and thermal requirements. In use, pluggable optical modules are used by networking hardware, such as switches, routers, etc., to provide optical interconnect.

From a management perspective, there is a requirement in software for some access to the pluggable optical module within a short time, typically two seconds which is referred to herein as a short interval, after the module is inserted in a host device. For example, the IA OIF-C-CMIS-01.0 "Implementation Agreement for Coherent CMIS," Jan. 14, 2020, from the Optical Internetworking Forum, the contents of which are incorporated by reference herein, defines management interfaces for 400ZR modules. The Common Management Interface Specification (CMIS), Rev. 4.0, May 8, 2019, from the QSFP-DD MSA Group, the contents of which are incorporated by reference herein, defines a management communication based on a Two-Wire-Interface (TWI), for QSFP Double Density (QSFP-DD), OSFP, COBO, QSFP, and SFP-DD. The CMIS management specification, by reference to preceding specifications, covering QSFP-DD as well as similarly managed module types, requires a module to transition from a reset state into a low power state within the short interval. In the low power state, the module is required to allow access to all registers, as well as configuration; configurations will not be applied, however, until the module transitions from the low power state to a high-power state. The transition from the low-power to the high-power state does not have an MSA defined time and is reported (advertised) by the module.

Existing pluggable modules, e.g., SFP, XFP, etc., require only rudimentary software for control. This software is inherently small, and likely does not employ an Operating System (OS) in many cases. Thus, the industry expected short interval (two seconds) from reset to a live management interface does not present a challenge. Similarly, the lower complexity hardware of many modules makes low standby power requirements easy to meet. Alternatively, battery-powered devices achieve fast recovery from "sleep" modes and ultra-low power dissipation while sleeping through aggressive, hardware-centric power management functions: (variable number and type of cores, variable voltage and frequency of computation, dynamic control of power islands etc.). Even then, such solutions do not provide a live interface quickly when recovering from the powered-off state.

Traditionally, the pluggable optical modules were used for client interfaces, namely shorter reach applications, again, e.g., SFP, XFP, etc. However, pluggable optical modules are moving toward more complex implementations and functions, including support for line interfaces, including coherent modulation. As pluggable optical modules trend toward more complex functions, including coherent modulation, the required management software and software environment becomes more complex. For example, coherent QSFP-DD modules can take tens of seconds (e.g., 30-40 s) to be fully operational, referred to herein as long interval which is greater than the short interval, far outside the short interval (two second) requirement. QSFP-DD modules are defined in the QSFP-DD Hardware Specification for QSFP DOUBLE DENSITY 8× PLUGGABLE TRANSCEIVER, Rev 5.0, Jul. 9, 2019, the contents of which are incorporated by reference. There is a need for a host device to have some ability to read data from the module quickly, and tens of seconds are not sufficient. One existing solution is to constrain the power and functionality of a processor in advanced modules. Other approaches can include additional hardware resources for quick boot-up. At a point, achieving a very fast power to response time through "brute force" becomes uneconomical as significant compute resources would be required to boot sufficiently fast while never being used again during operation. More hardware-centric approaches do not achieve the required "fast on from no power" and introduce substantial additional design, reduced module management flexibility, and verification complexity.

BRIEF SUMMARY OF THE DISCLOSURE

The present disclosure relates to systems and methods for a management interface handler to expedite module boot time in pluggable optical modules. The management interface handler can be referred to as a shim layer and is used to quickly enable read/write management access to the pluggable optical module when it is inserted in a host device. Here, the pluggable optical module is configured to implement this early management interface handler with no changes to a host device. The host device can quickly perform read/write access with the pluggable optical module, within the short interval, while the boot process continues as normal to tens of seconds for the long interval. The management interface handler provides a live interface prior to the module processor booting. The processor may continue to boot in this low-power state, or delay until the transition to the high-power state commences. The same handler can be employed for "parking" a module in a low power state. Advantageously, the management interface handler enables complex pluggable optical modules to meet CMIS or similar compliance while still allowing advanced functionality.

In an embodiment, a pluggable optical module includes one or more optical interfaces; interfaces for electrically connecting to a host device for management communication; and one or more processors communicatively coupled to memory comprising instructions that, when executed, cause the one or more processors to, subsequent to insertion of the pluggable optical module in a host device and performance of a first stage of boot loader, execute an early management interface handler that supports access to memory for the management communication on the pluggable optical module by the host device, and continue a boot process of the pluggable optical module including loading an operating system and application software for control and management of the pluggable optical module, wherein the early management interface handler supports queries and provisioning requests from the host device while the boot process is performed. The early management interface handler is loaded after insertion, within less time than required by the full boot process.

The instructions can further cause the one or more processors to advertise a data path initialization time for the pluggable optical module to the host device. The instructions can further cause the one or more processors to pause the boot process and remain in a low-power mode with the early management interface handler operational. The boot process can include authentication and at least the application software can be encrypted. The pluggable optical module can be a Quad Small Form-factor Pluggable (QSFP) or variant thereof. The pluggable optical module can be a C Form-factor Pluggable (CFP) or variant thereof. The pluggable optical module can be an Octal Small Form-factor Pluggable (OSFP) or variant thereof.

In another embodiment, a non-transitory computer-readable medium includes instructions stored thereon for programming one or more processors associated with a pluggable optical module to perform steps. The steps include, subsequent to insertion of the pluggable optical module in a host device and performance of a first stage of boot loader, executing an early management interface handler that supports access to memory for management communication on the pluggable optical module by the host device; and continuing booting of the pluggable optical module including loading an operating system and application software for control and management of the pluggable optical module, wherein the early management interface handler supports queries and provisioning requests from the host device while the booting is performed. The early management interface handler is loaded after insertion, within less time than required by the full boot process.

The steps can further include advertising a data path initialization time for the pluggable optical module to the host device. The steps can further include pausing the booting and remaining in a low-power mode with the early management interface handler operational. The booting can include authentication, and at least the application software can be encrypted. The pluggable optical module can be a Quad Small Form-factor Pluggable (QSFP) or variant thereof. The pluggable optical module can be a C Form-factor Pluggable (CFP) or variant thereof. The pluggable optical module can be an Octal Small Form-factor Pluggable (OSFP) or variant thereof.

In a further embodiment, a method includes, subsequent to insertion of a pluggable optical module in a host device and performance of a first stage of boot loader, loading an early management interface handler that supports access to memory for management communication on the pluggable optical module by the host device; and continuing booting of the pluggable optical module including loading an operating system and application software for control and management of the pluggable optical module, wherein the early management interface handler supports queries and provisioning requests from the host device while the booting is performed. The early management interface handler is loaded after insertion, within less time than required by the full boot process. The method can further include advertising a data path initialization time for the pluggable optical module to the host device. The method can further include pausing the booting and remaining in a low-power mode with the early management interface handler operational.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Again, the present disclosure relates to systems and methods for a management interface handler to expedite module boot time in pluggable optical modules. The management interface handler can be referred to as a shim layer and is used to quickly enable read/write management access to the pluggable optical module when it is inserted in a host device. Here, the pluggable optical module is configured to implement this early management interface handler with no changes to a host device. The host device can quickly perform read/write access with the pluggable optical module, within the short interval, while the boot process continues as normal to tens of seconds for the long interval. The management interface handler provides a live interface prior to the module processor booting. The processor may continue to boot in this low-power state, or delay until the transition to the high-power state commences. The same handler can be employed for "parking" a module in a low power state. Advantageously, the management interface handler enables complex pluggable optical modules to meet CMIS or similar compliance while still allowing advanced functionality.

Quad Small Form-Factor Pluggable (QSFP)

Figure 1:
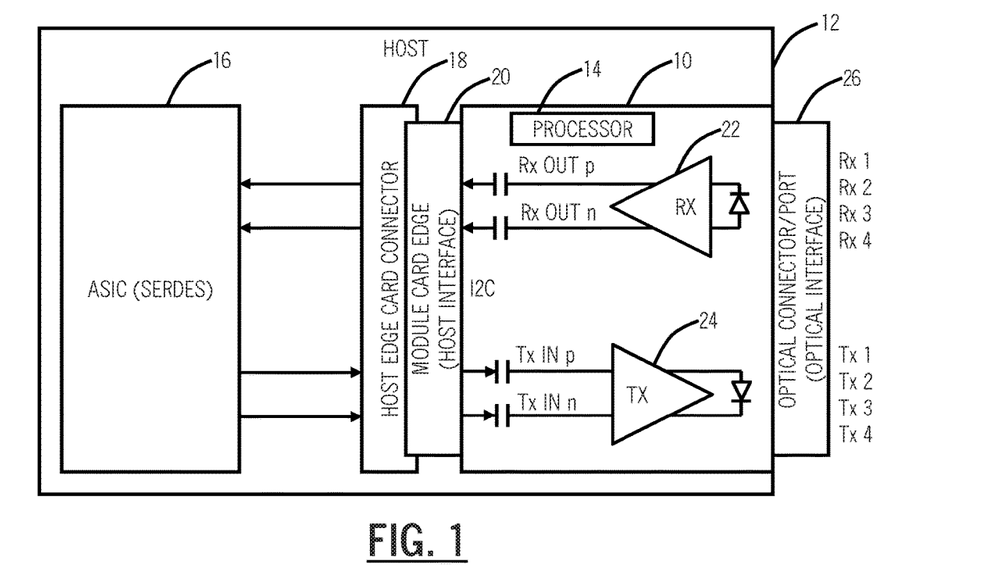
FIG. 1 is a block diagram of a QSFP module in a host device.

FIG. 1 is a block diagram of a QSFP module 10 in a host device 12. The QSFP module 10 is a compact, hot-pluggable transceiver used for data communications applications. The form factor and electrical interface are specified by an MSA under the auspices of the Small Form Factor (SFF) Committee. The QSFP module 10 interfaces networking hardware to a fiber optic cable or active or passive electrical copper connection. QSFP module 10 is an industry format jointly developed and supported by many network component vendors. The QSFP module 10 includes a processor 14 for operations and registers for exchanging data with the host device 12. The host device 12 can be a router, switch, or any other type of networking or computing device. The host device 12 can include an Application Specific Integrated Circuity (ASIC) 16 with a Serializer/Deserializer (SERDES) channels for interconnect, which is electrically connected to a host edge card connector 18. The host edge card connector 18 electrically and mechanically connects to a module card edge 20, which includes a management interface. The host edge card connector 18 and the module card edge 20 include electrical connections. The QSFP module 10 includes one or more receivers 22, which provide an Rx OUT p (p=non-inverted data output) and an Rx OUT n (n=inverted data output) from the received optical signal(s) to the host device 12. The QSFP module 10 includes one or more transmitters 24, which receive a Tx IN p (p=non-inverted data input) and a Tx IN n (n=inverted data input) from the host device and output transmit optical signal(s). The QSFP module 10 includes an optical connector/port 26, which provides optical interfaces, such as for four channels (Tx 1, Rx 1, etc.).

The QSFP module 10 is available with a variety of transmitter and receiver types, allowing users to select the appropriate transceiver for each link to provide the required optical reach over the available optical fiber type (e.g., multi-mode fiber or single-mode fiber). The QSFP module 10 is commonly available in several different categories. For example, 4×4 Gbit/s QSFP has four channels carrying Gigabit Ethernet, 4GFC (Fiber Channel), or DDR Infini-Band. 4×10 Gbit/s QSFP+ is an evolution of QSFP to support four 10 Gbit/sec channels carrying 10 Gigabit Ethernet, 10GFC Fiber Channel, or QDR InfiniBand. The four channels can also be combined into a single 40 Gigabit Ethernet link. 4×14 Gbit/s QSFP+ (QSFP14) is designed to carry FDR InfiniBand, and SAS-3. 4×28 Gbit/s QSFP+ (QSFP28) is designed to carry 100 Gigabit Ethernet or EDR InfiniBand. This transceiver type is also used with direct-attach breakout cables to adapt a single 100 GbE port to four independent 25 gigabit Ethernet ports (QSFP28-to-4×-SFP28).

The QSFP MSA and variants (QSFP+, QSFP28, etc.) defines electrical interfaces, management interfaces, optical interfaces, mechanical specifications and the like for providing 40G and 100G clients. Specifically, QSFP+ provides four electrical interfaces at 10G (XLPPI, XLAUI, etc.) and four optical interfaces at 10G. QSFP28 provides 100G via four 25G interfaces. QSFP+ is used to carry 40G traffic (40G striped across four optical lanes running @~10G each), or 4×10G services with each fiber carrying an independent 10G service. For example, the QSFP+ electrical specifications are defined in SFF-8679 "QSFP+4× Base Electrical Specification" Rev. 1.7, August 2014, the contents of which are incorporated by reference. QSFP-DD, which is a next-generation module for 400 GbE, 200 GbE, Nx100 GbE. Other module types such as microQSFP, QSFP56, OSFP, and the like are available/under development. The QSFP and the like can include a management interface connected over a Two-Wire Interface (TWI), such as Inter-Integrated Circuit (I2C). Other types of pluggable modules can utilize other management interfaces such as I3C, Management Data Input/Output (MDIO), Serial Gigabit Media-Independent Interface (SGMII), Peripheral Component Interconnect Express (PCIe), and the like, all of which are contemplated herein.

100G Form-Factor Pluggable (CFP)

Figure 2:
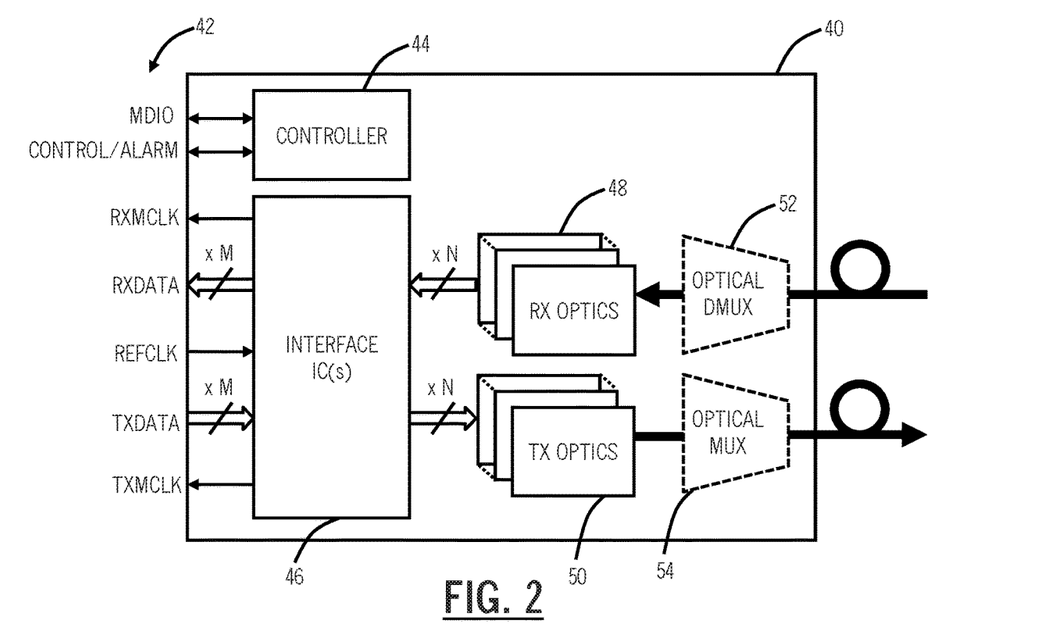
FIG. 2 is a block diagram of a CFP module.

FIG. 2 is a block diagram of a CFP module 40. The CFP module 40 is a hot-pluggable optical transceiver form factor enabling 40 Gb/s and 100 Gb/s applications and higher, including next-generation High-Speed Ethernet (40 GbE and 100 GbE). The electrical interface may include a nominal signaling lane rate at 10 Gbit/s per lane with various electrical interface specifications such as CAUI, XLAUI, OTL4.10, OTL3.4, and STL256.4. Other variants of CFP may include CFP2, which uses a signaling lane rates of 10 Gb/s or 25 Gbit/s per lane and CFP4, which uses a signaling lane rate of 25 Gb/s. CFP2 includes options for 10×10 Gb/s electrical signaling (i.e., CAUI) for 100GBASE-SR10, and 4×25 Gb/s electrical signaling (i.e., CAUI-4) for LR4 and ER4 applications. For example, the CFP MSA has an electrical interface of 4×10G (XLAUI) or 10×10G (CAUI), the CFP2 MSA has an electrical interface of 4×25G (CAUI4) or 10×10G (CPPI or CAUI). Another variant of CFP may include CDFP or CFP8, which uses a signaling lane rate of 25 Gbit/s per lane and has an electrical interface of 16×25G providing 400G (400GAUI-16). CFP8 also supports 8×50G electrical interfaces (400GAUI-8).

The CFP module 40 includes various pins 42, which interface to a host device (not shown in FIG. 2). The pins 42 are categorized as MDIO, control/alarm, a monitor Rx clock (RXMCLK), receive data (RXDATA), a reference Clock (REFCLK), transmit data (TXDATA), and a monitor Tx Clock (TXMCLK). The CFP module 40 includes a controller 44, interface integrated circuits (ICs) 46, receive optics 48, transmit optics 50, an optical demux 52, and an optical mux 54. The controller 44 interfaces the MDIO and control/alarm pins, and the interface integrated circuits 46 interfaces the remaining pins. The RXDATA and the TXDATA have M lanes (pins). The receive optics 48 and the transmit optics 50 can include multiple sets of transceivers, e.g., N, which are combined/split, such as using Wavelength Division Multiplexing (WDM) via the demux 52 and the mux 54.

Application for Pluggable Optical Modules

Note, the QSFP module 10 and the CFP module 40 are presented herein as an example type of pluggable optical modules. Those skilled in the art will recognize the systems and method described herein contemplate operation with any type of pluggable optical module, including ones using the CMIS or Coherent CMIS management standards, as well as other modules that support other types of management.

Figure 3:
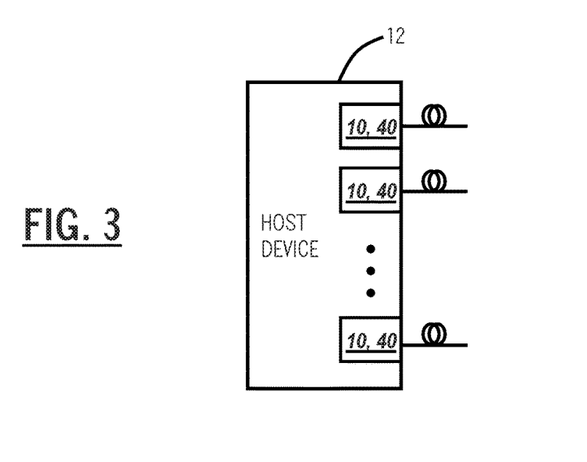
FIG. 3 is a block diagram of a host device with multiple pluggable optical modules included therein.

FIG. 3 is a block diagram of a host device 12 with multiple pluggable optical modules 10, 40 included therein. The host device 12 can include a switch, a router, a Wavelength Division Multiplexing (WDM) terminal, a server, a storage device, and the like. That is, the host device 12 can include any networking, computing, and/or storage device. The pluggable optical modules 10, 40 are used to provide optical interfaces between the host device 12 and an external device, such as a transponder, another switch, router, etc., and the like. Operationally, the host device 12 is configured to receive any compliant pluggable optical module 10, 40.

Management

The MDIO, I2C, and the like are used for communicating management between the host device 12 and the module 10, 40. This can include reading and writing data in registers or memory on the module 10, 40.

Again, the CMIS management spec, covering QSFP-DD as well as similarly managed module types, requires the module 10 to transition from a reset state into a low power state within the short interval. In the low power state, the module 10 is required to allow the host device 12 to access all registers, as well as configuration, namely read/write access. Of course, the configurations will not be applied until the module 10 transitions from the low-power state to the high-power state. The transition from the low-power to the high-power state does not have an MSA defined time and is reported, or "advertised", by the module 10.

The short interval is quick enough for the host device 12 to read registers on the pluggable optical modules 10, 40 to determine module type, module serial number, module capabilities, etc. It is an operational problem to have to wait 30-40 seconds to get this data. That is, the timing and functionality requirements regarding the low-power state pose two problems for more advanced modules, such as the modules 10, 40. First, the processors that are desirable for module management are not capable of booting inside of the short interval. Second, the power dissipation requirements for the low-power state place limits on processor types and constrain the available options—and in some cases are incompatible with the processing power requirements. For example, timing in excess of the short interval can be based on advanced functionality in the modules 10, 40, such as for laser tuning (spectrum or wavelength), training for control loops, coherent transmission, etc.

The present disclosure addresses these challenges by implementing an interface handler (also referred to as a management interface handler, an early management interface handler, an early interface handler, etc.) that is used in the low-power state. This interface handler is indistinguishable by an external user, i.e., the host device 12, from an Application Interface Handler used in the high-power state. The early interface handler boots within the short interval requirement and uses minimal power. The early interface handler allows Read/Write (R/W) access to a full register set in the module 10, 40. When the module 10, 40 transitions to the high-power state, the full OS is loaded, and interface transitions from the early interface handler to the final interface handler. As described herein, an interface handler is software configured to manage read and write access between registers on the pluggable optical module 10, 40 and the host device 12.

Having an early interface handler can achieve speed from reset to a live management interface on a CMIS (Common Management Interface Specification) compliant pluggable or another similar optical module, while not constraining the power or boot time requirements for the full processor/OS.

CMIS is a push for standardization to increase compatibility with and across pluggable modules. Ideally, CMIS allows for the development of a universal host driver. Again, CMIS retains the requirement for a short interval start time. But CMIS does support a variable data path initialization time. The modules can advertise a worst-case initialization time to the host device 12, and the host device 12 must wait for at least the advertised time before declaring a link failure. This standard defined advertised time limit provides an opportunity, so long as the module provides basic interaction within the short interval, any additional time required to initialize may be hidden in the shadow of the "Datapath Init" which is module defined.

Management Problem Statement

Again, the pluggable optical modules 10, 40 are expected to respond to initial management operations within the short interval from the time reset is de-asserted (i.e., within 2 seconds of module insertion) by convention. Also, as described herein, the pluggable optical modules 10, 40 have evolved to incorporate more complex software with increasing complexity. The increasing software complexity and other factors, such as software security requirements, make this initial short interval response time increasingly difficult to achieve. However, maintaining the short interval is desirable. At the very least, this desire is motivated so that when a pluggable optical module 10, 40 is inadvertently plugged into an older system, it behaves as expected on plug in and can be identified as a non-compatible unit. Thus, the first issue is how to have the module's management interface become responsive within the short interval while allowing for ever more complex and larger management software.

Also, the pluggable optical modules 10, 40 are expected to remain in a low-power state until signaled to allow entry into the fully operational high-power state. The module management interface is required to be active while this low-power state is maintained. Achieving this low-power function with a classical module is trivial as the required hardware and software functions are much less complex. For example, in a simple client type plug, a low-power mode is easily achieved simply by keeping the optical transmit laser disabled. The increasing hardware and software complexity and other factors, such as software security requirements and coherent modulation, means that the power difference between an efficient low-power state and an operational state is much larger. Achieving an efficient low-power mode is thus more challenging. Thus, the second issue is how to achieve a low power target (for example, less than 2 W) on a pluggable module that may dissipate as much as 7× to 12× or, perhaps, even more power when fully operational.

Early Interface Handler

Figure 4:
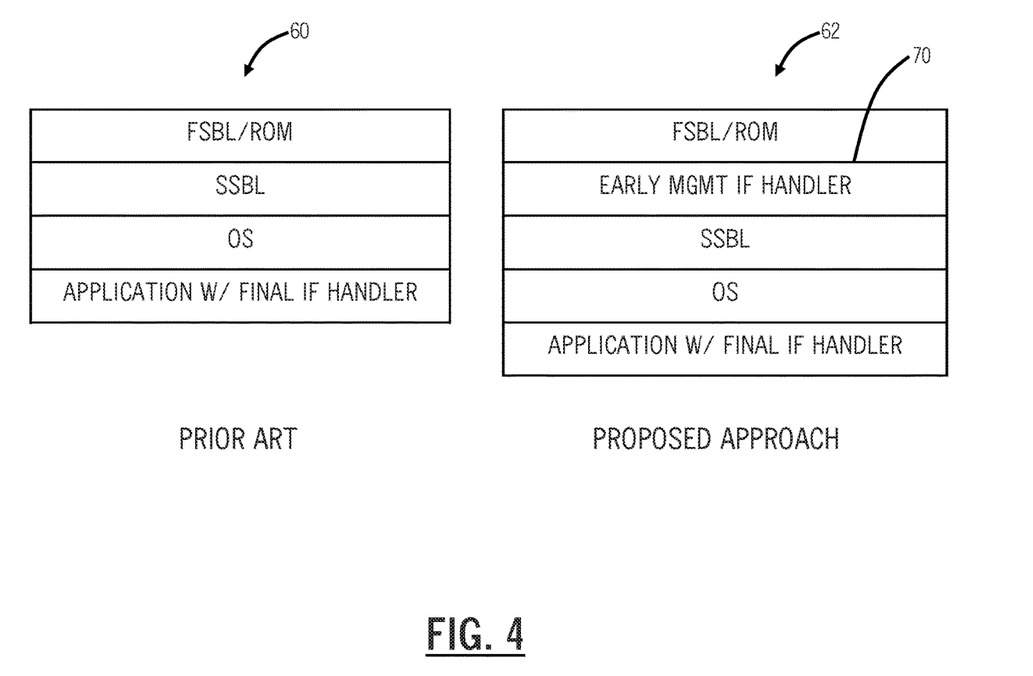
FIG. 4 is a diagram of a typical conventional boot process contrasted with a boot process with an early management interface handler of the present disclosure.

FIG. 4 is a diagram of a conventional boot process 60 contrasted with a boot process 62 with an early management interface handler 70 of the present disclosure. The conventional boot process 60 includes a First Stage Boot Loader (FSBL) in Read-Only Memory (ROM), a Second Stage Boot Loader (SSBL), Operating System (OS), and finally the application (a program for the required functionality of the module 10, 40) with a final interface (IF) handler. Again, in this conventional boot process 60, the timing is significantly greater than the short interval for complex modules 10, 40. The host device 12 only supports read/write access at the final interface (IF) handler.

The boot process 62 proposed herein includes the First Stage Boot Loader (FSBL) in Read-Only Memory (ROM), followed by the early management interface handler 70. The early management interface handler 70 allows the host device 12 to support read/write access of memory (registers) in the module 10, 40. The early management interface handler 70 allows the host device 12 to query the module 10, 40 within the short interval, while the module 10, 40 continues the boot process 62 with the Second Stage Boot Loader (SSBL), Operating System (OS), and finally the application (a program, or programs, for the required functionality of the module 10, 40) with a final interface (IF) handler.

The First Stage Boot Loader (FSBL) is typically in ROM code but can be a hardware Finite State Machine. The Operating System (OS) can be optional, e.g., simple plugs (e.g., SFP) may not need the overhead of an OS. However, in complex modules 10, 40 an Operating System (OS) provides a much better platform for development of the required software. The application includes all of the software required to configure, activate, and monitor an optical link associated with the module 10, 40. Again, in typical low complexity modules, the application is fully started and able to respond within the short interval. In a secure boot scenario, the last three of the four steps must be authenticated, namely the SSBL, OS, and application. Furthermore, at least the application must be encrypted. Optionally, earlier stage code may also be encrypted. Also, the early management interface handler 70, in a secure environment, must be limited to only allowing access and changes to the memory associated with management. Otherwise, modifications could be employed to defeat some or all of the security features of the secure environment.

In the boot process 62, the order includes the First Stage Boot Loader (typically ROM code but may be a hardware FSM) and then the early management interface handler 70. The early management interface handler 70 (also can be referred to as an early management interface handler). The early management interface handler 70 handles simple queries (read) and provisioning requests (write) with the host device 12. The early management interface handler 70 can include advertising the data path initialization time. After the early management interface handler 70, the boot process 62 includes the Second Stage Boot Loader, the Operating System which is much more common in a complex plug. Finally, the boot process 62 includes the application (again, all of the software required to configure, activate, and monitor the optical link). The application can include the complete Management Interface handler. The application can also include all complex control algorithm software, security features, etc.

The full boot time for a complex module exceeds the short interval, but the early management interface handler 70 is fully started and able to respond within the short interval. In a secure boot scenario, the early management interface handler 70 may likely require authentication only as the early management interface handler 70 is unlikely to contain any information of proprietary value. This observation is useful as authentication alone is faster than authentication and decryption, which can further reduce the early management interface handler 70 boot time. The remaining boot stages must be authenticated and encrypted as required to provide protection and module security.

Low-Power Mode

A first benefit of the early management interface handler 70 is the ability for the host device to read/write quickly, within the short interval. A second benefit of the early management interface handler 70 is that it may be used (if desired) to provide the lowest possible standby power for a module 10, 40. The early management interface handler 70 is smaller and less complex than the hardware and software required to implement a fully functional operational pluggable optical module 10, 40. Thus, the early management interface handler 70 can be exploited to enable the lowest power standby mode. When the module 10, 40 is being instructed, by hardware or software signal, to remain in the low-power state, the boot process may be paused indefinitely once the boot of the early management interface handler 70 is completed. Given the relatively negligible demands of the early management interface handler 70 and the management interface hardware, this mode can be employed to keep a great deal of the pluggable module function in a reset or powered down state, thus minimizing the power consumed.

Calculating the Advertised Data Path Initialization Time

Offline, the worst-case OS boot time, $T_{OS}$, can be determined analytically, by simulation, or by empirical measurement. The worst-case data path initialization time, $T_{DPINIT}$, can be determined analytically, by simulation, or by empirical measurement.

Thus, the modified data path initialization time to report, or advertise, is $T_{MODIFIED} = T_{OS} \, T_{DPINIT} +$ the short interval.

The boot process 62 can include while booting the plug optical control software:

1) reading the required modem identification information from non-volatile memory;
2) advertising the modified data path initialization time via the early management interface handler 70; and
3) accepting any initial provisioning from the host device 12.

These functions can be implemented by software, hardware, and/or a combination thereof. The host device 12 will see a responsive interface after at most the short interval. The boot process continues by loading and running the OS, followed by loading and running the application. If the host device 12 issues a data path initialization request before the module 10, 40 is fully booted, the extra time required to complete booting is hidden in the shadow of the advertised modified data path initialization time.

Thus, employing a low complexity early management interface handler 70 is useful in achieving the required response time (<2 s from reset de-asserted) expected from pluggable optical modules 10, 40. The early management interface handler 70 may be further exploited to minimize the required active resources in a low power standby mode to provide for the lowest possible standby power.

Data Path Initialization Register

In an embodiment, the modules 10, 40 can include a register, bit, memory location, or some other mechanism to signal to the host device 12 that the boot process 60, 62 is complete. This indicator can be used in the boot process 62 for coordinating between the early management interface handler 70 and the final interface (IF) handler.

Process

Figure 5:
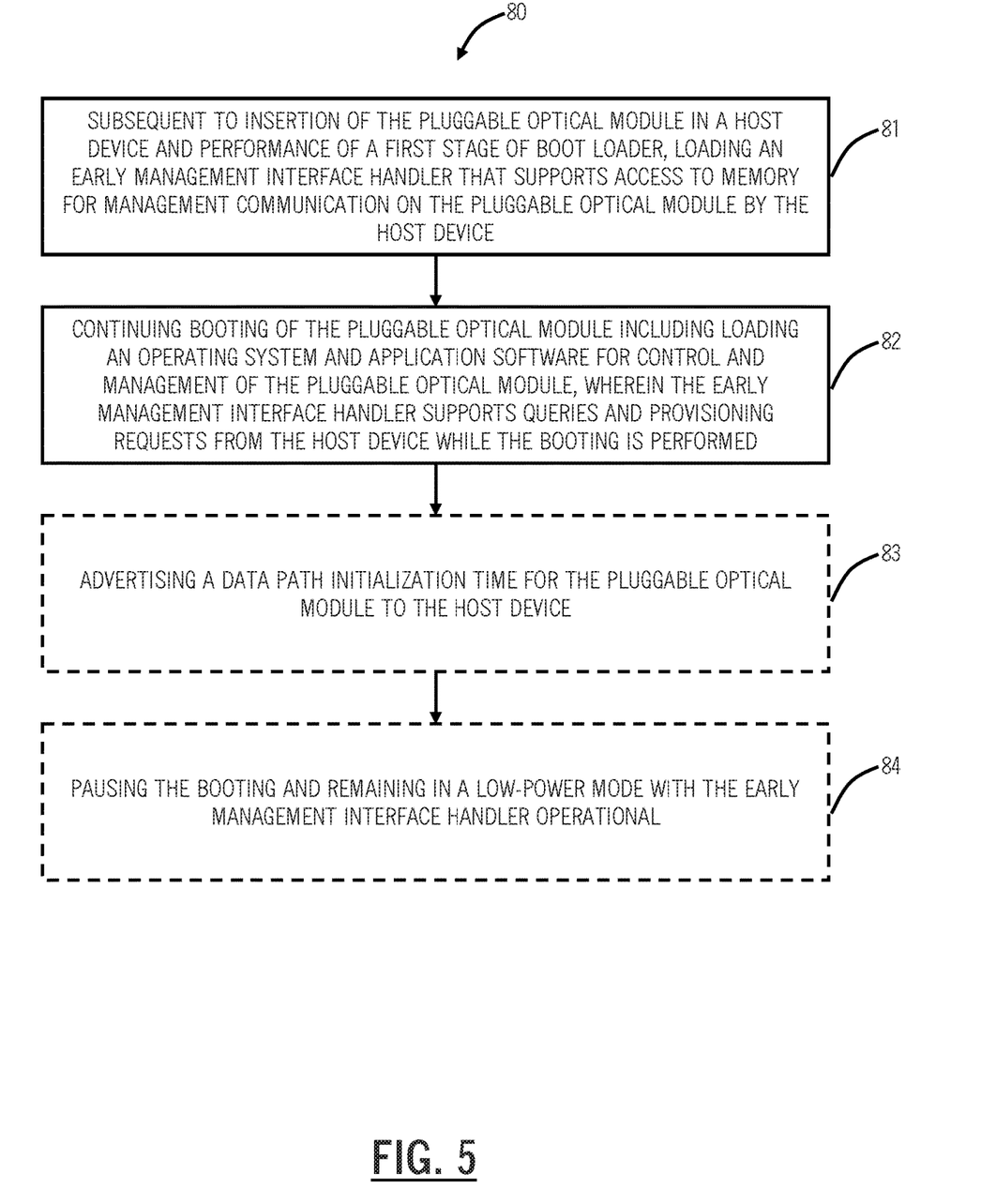
FIG. 5 is a flowchart of a pluggable optical module boot process.

FIG. 5 is a flowchart of a pluggable optical module boot process 80. The pluggable optical module boot process 80 includes, subsequent to insertion of the pluggable optical module in a host device and performance of a first stage of boot loader, loading an early management interface handler that supports access to memory for management communication on the pluggable optical module management interface by the host device (step 81); and continuing booting of the pluggable optical module including loading an operating system and application software for control and management of the pluggable optical module, wherein the early management interface handler supports queries and provisioning requests from the host device while the booting is performed (step 82). The memory can include registers, and the access can include read and/or write access. The early management interface handler is loaded within the short interval from the insertion, and wherein the boot process requires significantly more time than the short interval, i.e., the long interval.

The pluggable optical module boot process 80 can further include advertising a data path initialization time for the pluggable optical module to the host device (step 83). The pluggable optical module boot process 80 can further include pausing the booting and remaining in a low-power mode with the early management interface handler operational (step 84). The booting can include authentication, and at least the application software is encrypted, but optionally the operating system is also encrypted The pluggable optical module can be one of a Quad Small Form-factor Pluggable (QSFP) or variant thereof and a C Form-factor Pluggable (CFP) or variant thereof, but other types of modules are also contemplated.

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, processor, circuit, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Specifically, the processor 14 and the controller 44 are shown herein as two example devices configured to implement the various techniques described herein for the early management interface handler. Note, these devices can include a single-core processor or a multi-core processor design, as is known in the art. In a multi-core processor, the early management interface handler may run on one core while the other core may run the remaining boot process.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A pluggable optical module comprising:
one or more optical interfaces;
interfaces for electrically connecting to a host device for management communication; and
one or more processors communicatively coupled to memory comprising instructions that, when executed, cause the one or more processors to
subsequent to insertion of the pluggable optical module in a host device and performance of a first stage of boot loader, execute an early management interface handler that supports access to memory for the management communication on the pluggable optical module by the host device, and
continue a boot process of the pluggable optical module including loading an operating system and application software for control and management of the pluggable optical module, wherein the early management interface handler supports queries and provisioning requests from the host device while the boot process is performed.

2. The pluggable optical module of claim 1, wherein the early management interface handler is loaded after insertion, within less time than required by a full boot process.

3. The pluggable optical module of claim 1, wherein the instructions further cause the one or more processors to advertise a data path initialization time for the pluggable optical module to the host device.

4. The pluggable optical module of claim 1, wherein the instructions further cause the one or more processors to pause the boot process and remain in a low-power mode with the early management interface handler operational.

5. The pluggable optical module of claim 1, wherein the boot process includes authentication and at least the application software is encrypted.

6. The pluggable optical module of claim 1, wherein the pluggable optical module is a Quad Small Form-factor Pluggable (QSFP) or variant thereof.

7. The pluggable optical module of claim 1, wherein the pluggable optical module is a C Form-factor Pluggable (CFP) or variant thereof.

8. The pluggable optical module of claim 1, wherein the pluggable optical module is an Octal Small Form-factor Pluggable (OSFP) or variant thereof.

9. A non-transitory computer-readable medium having instructions stored thereon for programming one or more processors associated with a pluggable optical module to perform steps of:
subsequent to insertion of the pluggable optical module in a host device and performance of a first stage of boot loader, executing an early management interface handler that supports access to memory for management communication on the pluggable optical module by the host device; and
continuing booting of the pluggable optical module including loading an operating system and application software for control and management of the pluggable optical module, wherein the early management interface handler supports queries and provisioning requests from the host device while the booting is performed.

10. The non-transitory computer-readable medium of claim 9, wherein the early management interface handler is loaded after insertion, within less time than required by a full boot process.

11. The non-transitory computer-readable medium of claim 9, wherein the steps further include advertising a data path initialization time for the pluggable optical module to the host device.

12. The non-transitory computer-readable medium of claim 9, wherein the steps further include
pausing the booting and remaining in a low-power mode with the early management interface handler operational.

13. The non-transitory computer-readable medium of claim 9, wherein the booting includes authentication, and at least the application software is encrypted.

14. The non-transitory computer-readable medium of claim 9, wherein the pluggable optical module is a Quad Small Form-factor Pluggable (QSFP) or variant thereof.

15. The non-transitory computer-readable medium of claim 9, wherein the pluggable optical module is a C Form-factor Pluggable (CFP) or variant thereof.

16. The non-transitory computer-readable medium of claim 9, wherein the pluggable optical module is an Octal Small Form-factor Pluggable (OSFP) or variant thereof.

17. A method comprising:
subsequent to insertion of a pluggable optical module in a host device and performance of a first stage of boot loader, loading an early management interface handler that supports access to memory for management communication on the pluggable optical module by the host device; and continuing booting of the pluggable optical module including loading an operating system and application software for control and management of the pluggable optical module, wherein the early management interface handler supports queries and provisioning requests from the host device while the booting is performed.

18. The method of claim 17, wherein the early management interface handler is loaded after insertion, within less time than required by a full boot process.

19. The method of claim 17, further comprising
advertising a data path initialization time for the pluggable optical module to the host device.

20. The method of claim 17, further comprising
pausing the booting and remaining in a low-power mode with the early management interface handler operational.

* * * * *